United States Patent
Butterworth et al.

(10) Patent No.: US 6,738,863 B2
(45) Date of Patent: May 18, 2004

(54) METHOD FOR REBUILDING META-DATA IN A DATA STORAGE SYSTEM AND A DATA STORAGE SYSTEM

(75) Inventors: Henry Esmond Butterworth, San Jose, CA (US); Robert Bruce Nicholson, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 09/992,284

(22) Filed: Nov. 13, 2001

(65) Prior Publication Data

US 2002/0062422 A1 May 23, 2002

(30) Foreign Application Priority Data

Nov. 18, 2000 (GB) .............................................. 0028214

(51) Int. Cl.$^7$ .............................................. G06F 12/08
(52) U.S. Cl. ...................................... 711/114; 711/112
(58) Field of Search ................................. 711/112, 114

(56) References Cited

U.S. PATENT DOCUMENTS

| | | |
|---|---|---|
| 6,052,799 A | 4/2000 | Li et al. |
| 6,438,661 B1 * | 8/2002 | Beardsley et al. .......... 711/144 |
| 6,571,248 B1 * | 5/2003 | Kusama ...................... 707/100 |
| 2003/0115219 A1 * | 6/2003 | Chadwick ................... 707/200 |

* cited by examiner

*Primary Examiner*—Mano Padmanabhan
*Assistant Examiner*—Midys Inoa
(74) *Attorney, Agent, or Firm*—Silicon Valley IP Group, PC; Dominic M. Kotab (57) ABSTRACT

A method for rebuilding meta-data stored in a data storage system (104) having storage devices (106) in which segments of data are located; for example, a storage system in the form of a log structured array. Data is written in segments to the storage devices (106) from a plurality of flows (122) of data and each segment of data contains meta-data relating to that segment. The meta-data stored in the storage system (104) can be rebuilt in the event of a failure by scanning the meta-data in each segment. A first scan of the meta-data in each segment in the storage devices (106) identifies the last segment written from each flow (122) and these segments are excluded from the rebuilding process as they may contain incomplete or inconsistent information. A second scan of the meta-data in each segment in the storage devices (106) identifies any segments which do not contain any live data tracks and these segments are also excluded from the, rebuilding process. The meta-data in the storage system (104) can then be rebuilt using the meta-data in the segments, excluding those segments identified.

27 Claims, 3 Drawing Sheets

METHOD FOR REBUILDING META-DATA IN A DATA STORAGE SYSTEM AND A DATA STORAGE SYSTEM

FIELD OF THE INVENTION

This invention relates generally to a method for rebuilding meta-data in a data storage system and a data storage system, more particularly, to a method and system for validating segments during meta-data rebuild of a log structured array.

BACKGROUND OF THE INVENTION

A data storage subsystem having multiple direct access storage devices (DASDs) may store data and other information in an arrangement called a log structured array (LSA).

Log structured arrays combine the approach of the log structured file system architecture as described in "The Design and Implementation of a Log Structured File System" by M. Rosenblum and J. K. Ousterhout, ACM Transactions on Computer Systems, Vol. 10 No. 1, February 1992, pages 26–52 with a disk array architecture such as the well-known RAID (redundant arrays of inexpensive disks) architecture which has a parity technique to improve reliability and availability. RAID architecture is described in "A Case for Redundant Arrays of Inexpensive Disks (RAID)", Report No. UCBICSD 87/391, December 1987, Computer Sciences Division, University of California, Berkeley, Calif. "A Performance Comparison of RAID 5 and Log Structured Arrays", Proceedings of the Fourth IEEE International Symposium on High Performance Distributed Computing, 1995, pages 167–178 gives a comparison between LSA and RAID 5 architectures.

An LSA stores data to an array of DASDs in a sequential structure called a log. New information is not updated in place, instead it is written to a new location to reduce seek activity. The data is written in strides or stripes distributed across the array and there may be a form of check data to provide reliability of the data. For example, the check data may be in the form of a parity check as used in the RAID 5 architecture which is rotated across the strides in the array.

An LSA generally consists of a controller and N+M physical DASDs. The storage space of N DASDs is available for storage of data. The storage space of the M DASDs is available for the check data. M could be equal to zero in which case there would not be any check data. If M=1 the system would be a RAID 5 system in which an exclusive-OR parity is rotated through all the DASDs. If M=2 the system would be a known RAID 6 arrangement.

The LSA controller manages the data storage and writes updated data into new DASD locations rather than writing new data in place. The LSA controller keeps an LSA directory which it uses to locate data items in the array.

As an illustration of the N+M physical DASDs, an LSA can be considered as consisting of a group of DASDs. Each DASD is divided into large consecutive areas called segment-columns. If the DASDs are in the form of disks, a segment-column is typically as large as a physical cylinder on the disk. Corresponding segment-columns from the N+M devices constitute a segment. The array has as many segments as there are segment-columns on a single DASD in the array. One or more of the segment-columns of a segment may contain the check data or parity of the remaining segment-columns of the segment. For performance reasons, the check data or parity segment-columns are not usually all on the same DASD, but are rotated among the DASDs.

Logical devices are mapped and stored in the LSA. A logical track, sometimes referred to as a data block, is a set of data records to be stored. The data may be compressed or may be in an uncompressed form. Many logical tracks can be stored in the same segment. The location of a logical track in an LSA changes over time. The LSA directory indicates the current location of each logical track. The LSA directory is usually maintained in paged virtual memory.

Whether an LSA stores information according to a variable length format such as a count-key-data (CKD) architecture or according to fixed block architecture, the LSA storage format of segments is mapped onto the physical storage space in the DASDs so that a logical track of the LSA is stored within a single segment.

Reading and writing into an LSA occurs under management of the LSA controller. An LSA controller can include resident microcode that emulates logical devices such as CKD or fixed block DASDs. In this way, the physical nature of the external storage subsystem can be transparent to the operating system and to the applications executing on the computer processor accessing the LSA. Thus, read and write commands sent by the computer processor to the external information storage system would be interpreted by the LSA controller and mapped to the appropriate DASD storage locations in a manner not known to the computer processor. This comprises a mapping of the LSA logical devices onto the actual DASDs of the LSA.

In an LSA, updated data is written into new logical block locations instead of being written in place. Large amounts of updated data are collected as tracks in controller memory and destaged together to a contiguous area of DASD address space called a segment. A segment is usually an integral number of stripes of a parity system such as RAID 5. As data is rewritten into new segments, the old location of the data in previously written segments becomes unreferenced. This unreferenced data is sometimes known as "garbage". If this were allowed to continue without taking any action, the entire address space would eventually be filled with segments which would contain a mixture of valid (referenced) data and garbage. At this point it would be impossible to destage any more data into the LSA because no free log segments would exist into which to destage data.

To avoid this problem, a process known as "Free Space Collection" (FSC) or "Garbage Collection" must operate upon the old segments. FSC collects together the valid data from partially used segments to produce completely used segments and completely free segments. The completely free segments can then be used to destage new data. In order to perform free space collection, data structures must be maintained which count the number of garbage and referenced tracks in each segment and potentially also statistics which indicate the relative rate of garbage accumulation in a segment. (See "An Age Threshold Scheme for Garbage Collection in a Log Structured Array" Jai Menon, Larry J Stockmeyer. IBM Research Journal 10120.)

Log structured arrays are direct access storage devices which contain meta-data, which maps a virtual storage space onto physical storage resources. The meta-data maps extents of the virtual storage space (virtual tracks) onto real tracks collated into segments stored on the physical resources. The term meta-data includes, but is not limited to, data which describes or relates to other data. For example: data held in the LSA directory regarding the addresses of logical tracks in the physical storage space; data regarding the fullness of segments with valid (live) tracks; a list of free or empty segments; data for use in free space collection algorithms; the configuration of logical volumes; topology data.

Corruption of the meta-data renders the data stored in the virtual storage space inaccessible as without the meta-data it is impossible to determine which real track corresponds to a particular virtual track. It is therefore desirable to be able to rebuild the meta-data in the event that the meta-data is corrupted in order to restore access to the data.

A secondary source of the meta-data is needed to rebuild the meta-data to allow access to the stored data. A known method of providing a secondary source of the meta-data is to provide a segment directory containing information on the data blocks or tracks in the segment and storing the segment directory as part of the segment on the storage devices. The segment directory contains all the meta-data required to describe the blocks or tracks that have been closed in that segment together with some ordering information.

U.S. Pat. No. 6,052,799 describes a method for recovering the directory of a log structured array with a secondary source of meta-data being stored in segment directories. The method includes periodically writing a checkpoint of the directory to the storage devices. A list is also maintained of closed segments written to the storage devices since the checkpoint directory was written to the storage devices. During a directory recovery procedure, the checkpoint of the directory is read into memory, and for each segment that is indicated by the closed segments list as having been closed since the checkpoint of the main directory was written to the disk, the information in the corresponding segment directory and the ordering information therein is used to update the checkpoint directory.

A segment of data in a log structured array or a RAID is written across multiple storage devices in an array. Therefore, segments are often not written as an atomic event. Also, the storage devices do not always write data in one piece but may break it up and reorder it. If normal operation of an array is interrupted, a segment which is in the process of being written may be only partially written and may contain inconsistent information. For example, the segment directory may have been written and some but not all of the of the segment data, the segment directory of that segment cannot be used as it does not correctly reflect the contents of the segment.

The problem is to provide a meta-data rebuild process with a way of determining which segments can be trusted and which must be ignored as they may have only been partially written when a meta-data rebuild process is invoked after normal operation of an array was interrupted at any point. Only segments that were completely written can be trusted to contain consistent information.

Known solutions to the problem of not considering partial segments during the rebuild of a log structured array include making a journal of segment closes in progress in a fast non-volatile memory. This has the following problems: the non-volatile memory is resident in the controller and not the physical storage resource so meta-data rebuild is tied to the specific controller containing the non-volatile memory. This specific controller might also have failed. This memory might be transferable to another controller which could help. However, the meta-data rebuild might be required because the controller and hence the non-volatile memory was actually destroyed. The memory might be mirrored to a remote controller but this has performance problems and dual-controller configurations would hopefully not require meta-data rebuilds unless both controllers had been destroyed or the non-volatile data in both had been destroyed, for example by a flat battery, in which case both copies of the journal might be lost.

Another known method of trying to use only fully completed segments in a rebuild process is to mark the first and last sectors with a unique sequence number or signature. All segments with the same number in the first and last sector should then be valid. This method only works if the whole segment is written sequentially and is not broken up into several parts that are written in parallel. If the segment is split into multiple I/Os, the signature is no longer a guarantee that the entire segment has been written.

DISCLOSURE OF THE INVENTION

The aim of the present invention is to provide a method for rebuilding meta-data in a data storage system which only uses meta-data from valid fully written segments.

According to a first aspect of the present invention there is provided a method for rebuilding meta-data in a storage system having storage devices in which segments of data are located, wherein data is written in segments to the storage devices from a plurality of flows of data and each segment of data also contains meta-data relating to that segment; the method comprising: scanning the meta-data in each segment to identify the last segment written from each flow; rebuilding the meta-data in the storage system using the meta-data in the segments excluding the meta-data for the segments identified as being the last segments written from each flow.

Preferably, the data storage system includes a processor and memory, and the data storage devices are an array of storage devices having a plurality of data blocks organized on the storage devices in segments distributed across the storage devices, wherein when a data block in a segment stored on the storage devices in a first location is updated, the updated data block is assigned to a different segment, written to a new storage location and designated as a current data block, and the data block in the first location is designated as an old data block, and having a main directory, stored in memory, containing the locations on the storage devices of the current data blocks.

The data storage system may be a log structured array and the storage devices may be a plurality of direct access storage devices.

Optimally, the method includes scanning the meta-data of each segment to identify any segments which do not contain any current data blocks and wherein the method also comprises excluding any such segments from the rebuilding process.

The meta-data in the segments may include a description of data blocks stored in the segment and ordering information. Preferably, the ordering information includes an identifier of the flow from which the segment was written and a sequence number relating to the order the segments are written from one flow.

Preferably, the description of data blocks in the segment and the ordering information is written atomically in the segment. The description of the data blocks in a segment and the ordering information may be written in a single sector in a segment. Alternatively, the description of the data blocks in a segment and the ordering information may be written in more than one sector in a segment and wherein the writes of the sectors in a segment are atomicised by including the segment sequence number in each sector. Preferably, a segment with a plurality of sectors containing meta-data is ignored in the rebuilding process if the sectors have different segment sequence numbers.

Preferably, the last segment written from each flow is excluded from a free space collection process.

Preferably, writing a segment from a flow commits the previous segment written from that flow. A flow may be flushed by writing an empty segment in order to commit the previous segment from that flow.

According to a second aspect of the present invention there is provided a data storage system having storage devices in which segments of data are located, including a plurality of flows provided in the data storage system from which data is written in segments to the storage devices, each segment of data also containing meta-data relating to that segment; wherein meta-data in the storage system can be rebuilt using the meta-data in the segments excluding the meta-data for the segments identified as being the last segments written from each flow.

Preferably, the data storage system includes a processor and memory, and the data storage devices are an array of storage devices having a plurality of data blocks organized on the storage devices in segments distributed across the storage devices, wherein when a data block in a segment stored on the storage devices in a first location is updated, the updated data block is assigned to a different segment, written to a new storage location and designated as a current data block, and the data block in the first location is designated as an old data block, and having a main directory, stored in memory, containing the locations on the storage devices of the current data blocks.

The data storage system may be a log structured array and the storage devices may be a plurality of direct access storage devices. The log structured array may use check data in a storage device formed of an array of direct access storage devices.

According to a third aspect of the present invention there is provided a computer program product stored on a computer readable storage medium, comprising computer readable program code means for performing the steps of: scanning meta-data in each segment in storage devices to identify the last segment written from each of a plurality of flows of data; rebuilding the meta-data in the storage devices using the meta-data in the segments excluding the meta-data for the segments identified as being the last segments written from each flow.

Segments are written in a number of concurrent flows of segment writes. Each flow has increasing segment sequence numbers and each flow has an identifier. A segment write is not started in a flow until the previous segment write in that flow has completed. The meta-data rebuild process performs a pass which examines every segment sequence number/flow identifier to find the last segment written in every flow. These segments are potentially invalid and must be ignored. The meta-data rebuild process performs a second pass to determine which segments are void of valid tracks (i.e. all the tracks in these segments appear in other segments with more recent segment sequence numbers). These segments are also potentially invalid and must be ignored. The remaining segments are guaranteed to be valid.

The advantages of the method and system of the present invention are as follows:

No extra DASD operations are required.
Minimal CPU overhead is required.
No extra hardware is required.
The meta-data rebuild process requires only the information on the physical storage resources (and does not, for instance, require access to a separate non-volatile journal).

BRIEF DESCRIPTION OF THE DRAWINGS

An embodiment of the invention will now be described, by means of example only, with reference to the accompanying drawings in which.

DESCRIPTION OF THE PREFERRED EMBODIMENTS

Figure 1:
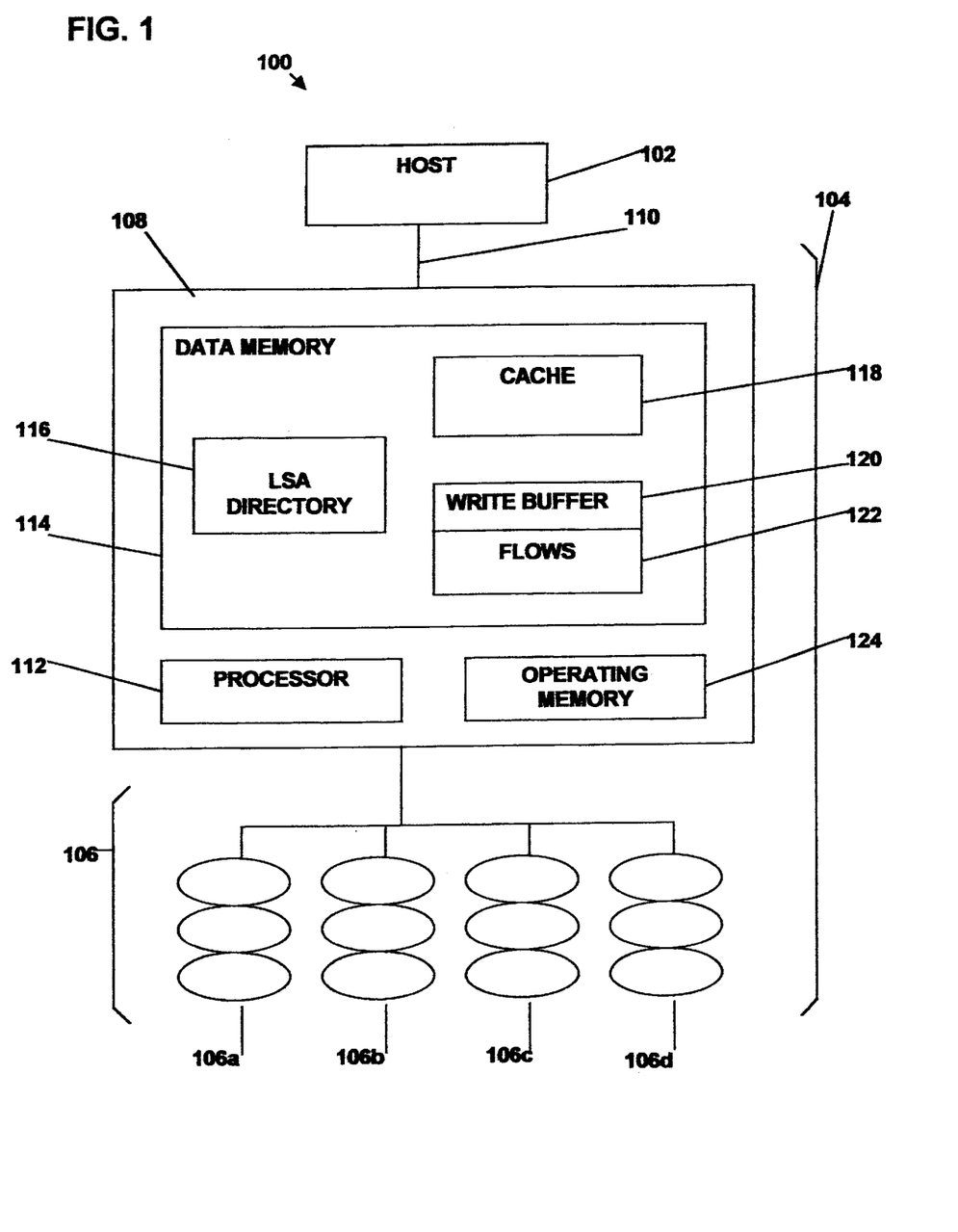
FIG. 1 shows a data storage system in accordance with the present invention.

FIG. 1 shows a preferred embodiment of a computer system 100 constructed in accordance with the present invention. The system 100 includes one or more processors 102 or host computers that communicate with an external information storage system 104 having N+M direct access storage devices (DASD) in which information is maintained as a log structured array (LSA). The storage space of N DASDs is available for storage of data. The storage space of the M DASDs is available for the check data. M could be equal to zero in which case there would not be any check data. If M=1 the system would be a RAID 5 system in which an exclusive-OR parity is rotated through all the DASDs. If M=2 the system would be a known RAID 6 arrangement.

In FIG. 1, an array 106 comprising four DASDs 106a, 106b, 106c, and 106d is shown for illustration, but it should be understood that the DASD array might include a greater or lesser number of DASD. A controller 108 controls the storage of information so that the DASD array 106 is maintained as an LSA. Thus, the DASD recording area is divided into multiple segment-column areas and all like segment-columns from all the DASDs comprise one segment's worth of data. The controller 108 manages the transfer of data to and from the DASD array 106. Periodically, the controller 108 considers segments for free space collection and selects target segments according to some form of algorithm, e.g. the greedy algorithm, the cost-benefit algorithm or the age-threshold algorithm all as known from the prior art, or any other form of free space collection algorithm.

The processor 102 includes (not illustrated): one or more central processor units, such as a microprocessor, to execute programming instructions; random access memory (RAM) to contain application program instructions, system program instructions, and data; and an input/output controller to respond to read and write requests from executing applications. The processor 102 may be coupled to local DASDs (not illustrated) in addition to being coupled to the LSA 104. Typically, an application program executing in the processor 102 may generate a request to read or write data, which causes the operating system of the processor to issue a read or write request, respectively, to the LSA controller 108.

When the processor 102 issues a read or write request, the request is sent from the processor to the controller 108 over a data bus 110. In response, the controller 108 produces control signals and provides them to an LSA directory 116 and thereby determines where in the LSA the data is located, either in a non-volatile LSA data cache 118 or in the DASD 106. The LSA controller 108 includes one or more microprocessors 112 with sufficient RAM to store programming instructions for interpreting read and write requests and for managing the LSA 104.

The controller 108 includes microcode that emulates one or more logical devices so that the physical nature of the external storage system (the DASD array 106) is transparent to the processor 102. Thus, read and write requests sent from the processor 102 to the storage system 104 are interpreted and carried out in a manner that is otherwise not apparent to the processor 102.

The data is written by the host computer 102 in tracks or blocks of data. Tracks are divided into sectors which can hold a certain number of bits. A sector is the smallest area on a DASD which can be accessed by a computer. As the controller 108 maintains the stored data as an LSA, over time the location of a logical track in the DASD array 106 can change. The LSA directory 116 has an entry for each logical track, to indicate the current DASD location of each logical track. Each LSA directory entry for a logical track includes the logical track number and the physical location of the track, for example the segment the track is in and the position of the track within the segment, and the length of the logical track in sectors. At any time, a track is live, or current, in at most one segment. A track must fit within one segment.

When the controller 108 receives a read request for data in a logical track, it determines the logical track in which the data is stored, examines the LSA directory 116, and determines the position in the DASD to which the logical track is currently mapped. The controller 108 then reads the relevant sectors from the corresponding DASD unit of the N+M units in the array 106.

New write data and rewrite data are transferred from the processor 102 to the controller 108 of the LSA 104. The new write and rewrite data are sent to the LSA data cache 118. Details of the new write data and the rewrite data are sent to the LSA directory 116. If the data is rewrite data, the LSA directory will already have an entry for the data, this entry will be replaced by an entry for the new data. The data, which is being rewritten, is now dead and the space taken by this data can be reused once it has been collected by the free space collection process.

The new write data and the rewrite data leave the LSA data cache 118 via track write flows 122 in a memory write buffer 120. Segments are written in a number of concurrent flows 122 of segment writes in order to achieve a high level of throughput of data being written to the DASDs. Each flow 122 has a sequence number variable which increases by a single increment when a segment is written to DASD from that flow. Each flow also has a flow identifier to distinguish it from the other flows. A segment write is not started until the previous segment write in that flow has completed.

When an individual flow of the track write flows 122 contains a segment's worth of data, the flow 122 is discharged into a memory write buffer 120 and the data is written into contiguous locations of the DASD array 106.

Although the inclusion of an LSA data cache 118 as described above can improve the overall performance of an LSA system, it should be understood that the inclusion of the data cache 118 is not essential. New write data and rewrite data could go directly to the flows 122.

As data writing proceeds to the DASD in this manner, the DASD storage in the LSA becomes fragmented. That is, after several sequences of destaging operations, there can be many DASD segments that are only partially filled with live tracks and otherwise include dead tracks.

The writing process described above will eventually deplete the empty segments in the DASD array 106. Therefore, a free space collection process is performed to create empty segments. Free space collection is carried out by choosing a certain number of partially-filled target segments in DASD and compacting the live tracks in these segments into a fewer number of full segments, thereby creating empty segments. For example, if free space collection is performed on three partially empty segments, and each has a 2/3 utilization rate, then the live tracks can be collected and reorganized into two full segments and one completely empty segment that is ready to receive new data. Thus, a net increase of one empty segment is created by the free space collection process. To ensure that an empty segment is always available in the DASD array 106, the array controller 108 periodically performs the free space collection process on segments in the LSA. The free space collection process is typically a low priority, background process. The free space collected segments are provided in one or more flows, with the same concept as the track write flows 122, from where they are written with new data.

The LSA 104 contains meta-data, data which provides information about other data which is managed within the LSA. The meta-data maps a virtual storage space onto the physical storage resources in the form of the DASDs 106 in the LSA 104. The term meta-data refers to data which describes or relates to other data. For example: data held in the LSA directory regarding the addresses of logical tracks in the physical storage space; data regarding the fullness of segments with valid (live) tracks; a list of free or empty segments; data for use in free space collection algorithms; the configuration of logical volumes; and topology data.

The meta-data contained in the LSA directory 116 includes the address for each logical track including the logical track number, the actual DASD drive number and segment within the DASD, the position of the track within the segment and the length of the logical track in sectors. Meta-data is also held in operational memory 124 in the LSA controller 108. This meta-data is in the form of an open segment list, a closed segment list, a free segment list and segment status listings.

When a plurality of virtual tracks in a track write flow 122 of the memory write buffer 120 are collated together and make up a segment's worth of data. The segment's worth of tracks is ready to be destaged to the DASDs. The parity is calculated depending on the form of array. In the case of a RAID 5 type of array, the parity is carried out by an exclusive-OR operation on the data tracks. All the data tracks and the parity that make up the segment are written to the DASDs.

A list or description of the tracks in the segment to be destaged is compiled in the form of a segment directory and this information together with ordering information in the form of a segment sequence number and flow identifier makes up meta-data which is written atomically as part of the segment. The segment sequence number is the sequential number allotted to each segment as it is destaged from a particular flow 122. This information is stored in a single sector of the segment so that it is possible to write it atomically. Alternatively, if the information will not fit into a single sector, then the information is spread over several sectors with the segment sequence number being written in each sector. The LSA directory 116 is updated to reflect the new physical storage locations of the updated current logical tracks.

The result is that a newly written segment is full of tracks and has a segment directory which holds a list of all the tracks in the segment together with the segment sequence number and the flow identifier. The LSA directory 116 also holds an address for each track. When tracks are rewritten by subsequent write processes, the updated tracks are written in new segments in the log structure and the track will be listed in the segment directory of the new segment. The tracks in the original segment become invalid and leave 'holes'. Segments with a large number of 'holes' are collected by the free space collection process in order to compress live tracks into full segments to release empty segments to be written to.

LSA segments can be categorized as one of the following: 'free', meaning the segment contains no live data and is ready to be opened; 'open', meaning the segment is available to hold logical tracks being destaged to DASD and is in the process of being filled with logical tracks being destaged; 'closing', meaning no destage data can be further assigned to it and it is in the process of being closed and written to DASDs; and 'closed', meaning all of its data has been written to DASDs.

If a failure or error occurs and the information in the LSA directory 116 is corrupted of obliterated, the data tracked by the directory 116 will be lost or unreliable. Examples of possible very severe failures include loss of power to the storage subsystem or a hardware failure in a component of the subsystem. These failures would be likely to obliterate the LSA directory 116 completely.

In order to be able to rebuild the meta-data it is necessary to obtain the mapping information stored in the meta-data in the LSA directory 116 from a redundant second source. The second source of this information is the set of records in the form of the segment directories where one record is stored in every segment and contains the mapping information pertaining to the tracks in that segment.

The LSA directory 116 can be rebuilt using the segment directories on the DASDs. The other forms of meta-data can also be rebuilt from the data in the segment directories, for example, the list of free segments, list of closed segments and segment status listings which might also have been lost. The process of rebuilding the LSA directory 116 involves first reading each segment's sequence number from when it was written to DASD and making an ordered list of all the segments in sequence number then reading the segment directory of each segment. The LSA directory 116 can then be rebuilt using the segment directory information. For each entry in the segment directory, the LSA directory entry for the corresponding logical track can be built up. However, some of the segment directory information may be inconsistent with the contents of the data tracks in that segment if a segment was in the process of 'closing' when the failure occurred.

The write of a segment to physical storage is not necessarily an atomic operation, for instance because the segment is distributed across a number of DASDs for performance and/or redundancy. In the cases where the write of a segment is not atomic and segment writes were not completed before a meta-data rebuild process was invoked, the meta-data rebuild process will come across segments which contain inconsistent information. If the meta-data rebuild process were to attempt to use this inconsistent information it might result in the failure of the rebuild process or the generation of incorrect meta-data which might result in subsequent failure once normal operation of the array was resumed.

In order to avoid segments which contain inconsistent information, the meta-data in the segment directories is examined before rebuilding the LDA directory 116. Some of the segments are identified as being possibly invalid as they are likely to have been in process when the failure occurred. These segments are therefore ignored during the rebuild process. The meta-data rebuild process performs a pass through the segment information for all of the segments stored on the DASD array. Only the meta-data information in the segment directories for each segment is scanned, in other words the list of tracks and the segment sequence number and the flow identifier information contained in one or more sectors of the segment.

The meta-data rebuild process performs a first pass which examines every segment directory for the segment sequence number and flow identifier to find the last segment written from each flow 122. These segments are potentially invalid because they were 'closing' and in progress when normal operation was interrupted and these segments must be ignored. The write of a segment is not a single event as the segment is distributed across a number of DASDs for performance and/or redundancy. Therefore, if a failure occurs during the writing of a segment, the segment may contain inconsistent information. The rebuild process rebuilds the LSA directory 116 to a form before the last segment from each flow 122 was written.

The meta-data rebuild process performs a second pass of the segment directories to determine which segments are void of live tracks i.e. all the tracks in these segments appear in other segments with more recent segment sequence numbers. These segments are also potentially invalid because they were available for free-space collection and may potentially have been 'open' and in the process of being overwritten when normal operation was interrupted. These segments must also be ignored. The remaining segments should be valid.

In the case where the information regarding the list of tracks, the segment sequence number and the flow identifier cannot fit in a single sector, the meta-data is written to multiple sectors. Each of the multiple sectors has the segment sequence number written to it and the multiple sectors are atomicised. In this way the multiple sectors containing the meta-data are written together. In the rebuild process, segments with multiple sectors having different sequence numbers must also be ignored as this indicates that the writing of the meta-data in multiple sectors was not completed when the operation was interrupted.

If the last segment of a flow has no valid or live tracks due to subsequent writes of the data tracks in the segment it would normally be available for free space collection. However, if the last segment of a flow is used for free space collection, the penultimate segment for that flow then becomes the last segment for that flow when the sequence numbers are read. This means that the penultimate segment, which is a valid fully committed segment, is ignored in the meta-data rebuild process. Therefore, the last segment of every flow is excluded from the set of segments available to the free-space collection process. Free-space collecting the last segment of a flow and re-using it for a different flow would result in a committed segment in the first flow being interpreted as invalid by the meta-data rebuild process.

On initial system start, the segment sequence number for each flow 122 starts at zero and it is incremented with every segment close, on system restart the segment sequence numbers continue from where they were. The segment sequence numbers have a sufficient number of bits that they never wrap and revert to zero.

Figure 2:
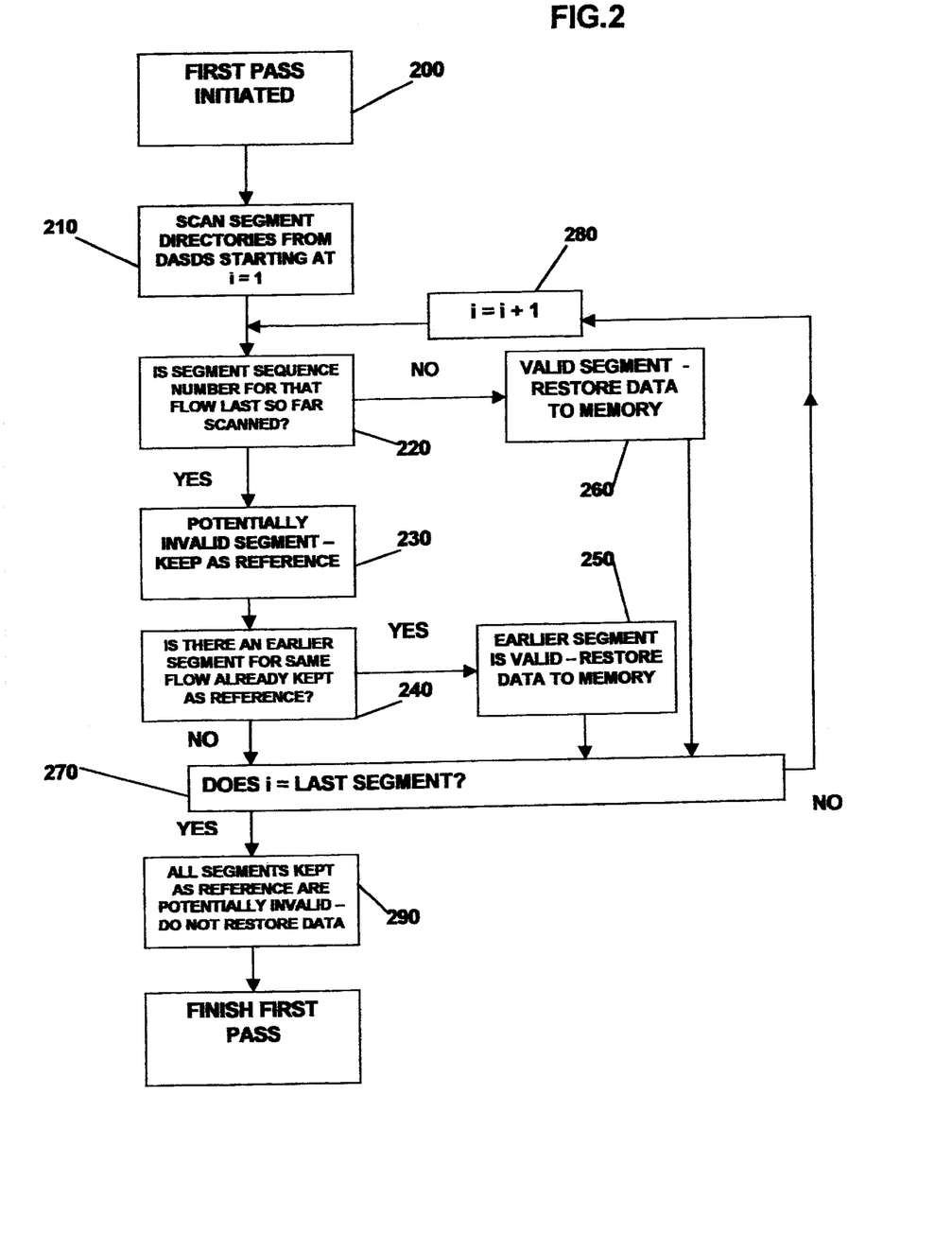
FIG. 2 shows a flow diagram of a first pass through segment information in a method of rebuilding meta-data in a data storage system in accordance with the present invention.

FIG. 2 is a flow diagram of the first pass 200 through the segment directories for selection of valid segments for the rebuild process. The first pass 200 is initiated by the rebuild process. The segment information in each segment directory in the form of the flow identifier and the segment sequence number is scanned 210 starting with segment i=1. For i=1, the segment sequence number will be the kept as reference, as it is the first segment scanned.

For subsequent segments, the segment sequence number is reviewed 220. If it is the latest segment sequence number located in the scanning so far for a particular flow identifier, then the segment is potentially the last one written from that flow and the segment is kept as reference 230. If there is already a segment for that flow identifier kept as reference 240, the earlier segment is valid 250 as there is now a later sequence number and the contents of the earlier segment directory can be considered valid and restored in the rebuild process.

If when the segment sequence number is reviewed 220, it is not the latest segment sequence located so far, it can be considered valid 260 and the directory used for restoring in the rebuild process.

When a segment is considered valid 250, 260 or the segment is being kept for reference, it is then checked 270 if i=the last segment in the DASDs. If i the last segment, i is incremented 280 by a segment and the scan is continued by returning to the segment sequence number review 220.

If i=the last segment in the DASDs, all the segments held in reference are the last segments written by each of the flows and these segments are potentially invalid so should be ignored 290 and their directory information not used for restoration during the rebuild process. The first pass is then finished.

Figure 3:
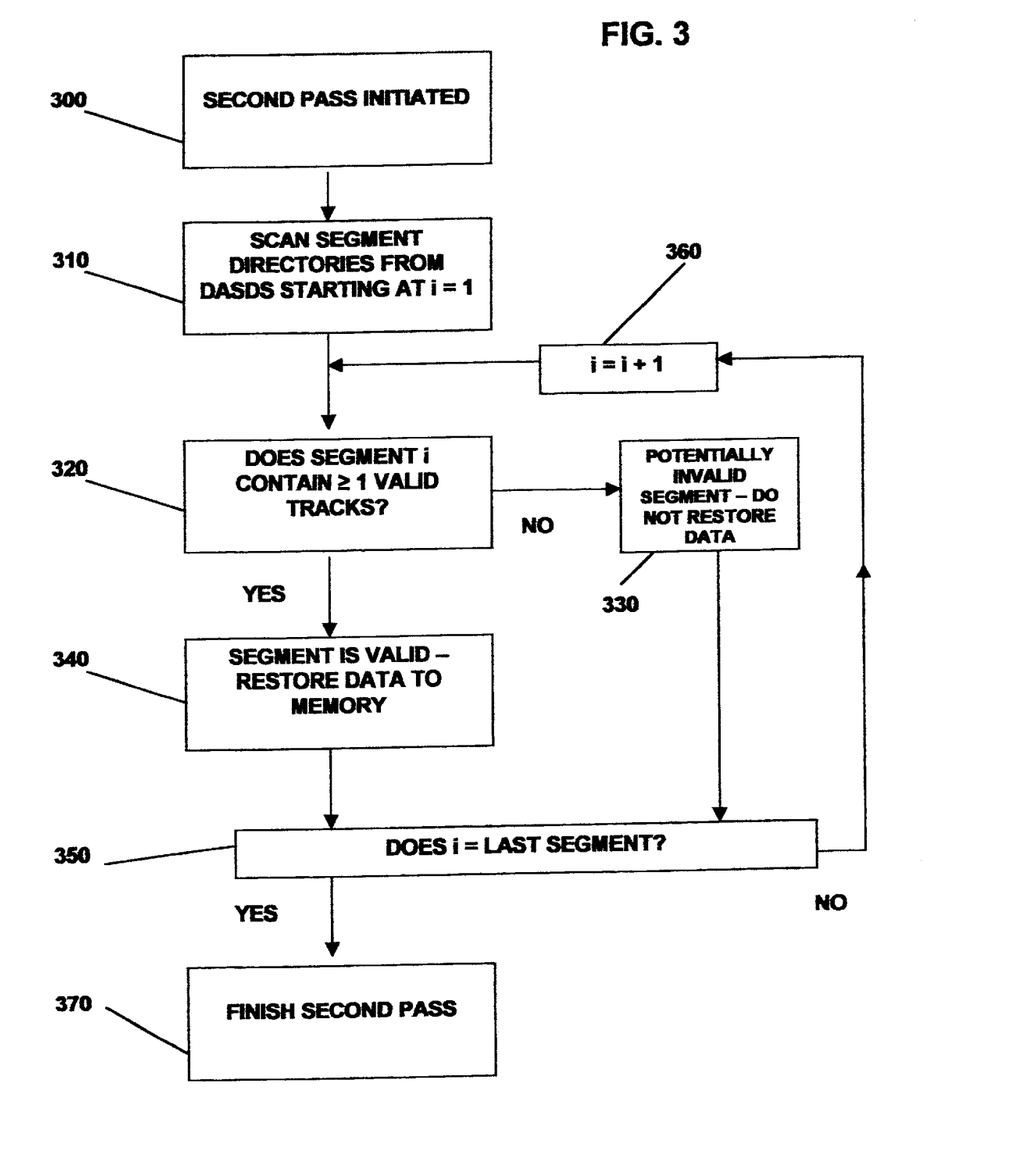
FIG. 3 shows a flow diagram of a second pass through segment information in a method of rebuilding meta-data in a data storage system in accordance with the present invention.

FIG. 3 is a flow diagram of the second pass 300 carried out by the rebuild process. The second pass is initiated and the segment directories of all the segments in the DASDs are scanned 310, 320 to identify any segments which do not contain any valid or live tracks i.e. all the tracks have subsequently been rewritten to other segments. This can be done by identifying segments where all the tracks in the segment appear in other segments with more recent segment sequence numbers. This scan 310 starts with segment i=1. If segment i does not contain any live tracks 330, it is potentially invalid and should not be restored as part of the rebuild process. If segment i contains one or more live tracks, it is valid 340 and can be restored during the rebuild process.

When a segment is considered valid 340 or invalid 330 it is checked 350 if i=the last segment in the DASDs. If i the last segment, i is incremented 360 by a segment and the scan is continued for the next segment. If i=the last segment, the second pass is finished 370.

During normal operation when the system is busy, write transactions which were collated into a segment which has been written to the physical resource are not completed until the segment is committed when further write transactions cause a subsequent segment in the same flow to be written.

Flushes of the system can be carried out by writing an empty segment in every flow to commit the last non-empty segment of every flow. The empty segment in each flow would be ignored by the meta-data rebuild process and the last non-empty segment and all preceding segments in each flow would be correctly processed which is the desired behaviour.

Multiple flows are required during normal operation when the system is busy for adequate performance; when the system is idle, individual flows can be flushed and then possibly shut-down by writing an empty segment to the flow.

Improvements and modifications can be made to the foregoing without departing from the scope of the present invention.

What is claimed is:

1. A method for rebuilding meta-data in a storage system having storage devices in which segments of data are located, wherein data is written in segments to the storage devices from a plurality of flows of data and each segment of data also contains meta-data relating to that segment; the method comprising:

scanning the meta-data in each segment to identify the last segment written from each flow;

rebuilding the meta-data in the storage system using the meta-data in the segments excluding the meta-data for the segments identified as being the last segments written from each flow.

2. A method as claimed in claim 1, wherein the data storage system includes a processor and memory, and the data storage devices are an array of storage devices having a plurality of data blocks organized on the storage devices in segments distributed across the storage devices, wherein when a data block in a segment stored on the storage devices in a first location is updated, the updated data block is assigned to a different segment, written to a new storage location and designated as a current data block, and the data block in the first location is designated as an old data block, and having a main directory, stored in memory, containing the locations on the storage devices of the current data blocks.

3. A method as claimed in claim 2, wherein the data storage system is a log structured array and the storage devices are a plurality of direct access storage devices.

4. A method as claimed in claim 2, wherein method includes scanning the meta-data of each segment to identify any segments which do not contain any current data blocks and wherein the method also comprises excluding any such segments from the rebuilding process.

5. A method as claimed in claim 2, wherein the last segment written from each flow is excluded from a free space collection process.

6. A method as claimed in claim 1, wherein the meta-data in the segments includes a description of the data blocks in the segment and ordering information.

7. A method as claimed in claim 6, wherein the ordering information includes an identifier of the flow from which the segment was written and a sequence number relating to the order the segments are written from one flow.

8. A method as claimed in claim 6, wherein the description of the data blocks in the segment and the ordering information are written atomically in the segment.

9. A method as claimed in claim 8, wherein the description of the data blocks in the segment and the ordering information are written in a single sector in a segment.

10. A method as claimed in claim 8, wherein the description of the data blocks in the segment and the ordering information are written in more than one sector in a segment and wherein the writes of the sectors in a segment are atomicised by including the segment sequence number in each sector.

11. A method as claimed in claim 10, wherein a segment with a plurality of sectors containing meta-data is ignored in the rebuilding process if the sectors have different segment sequence numbers.

12. A method as claimed in claim 1, wherein writing a segment from a flow commits the previous segment written from that flow.

13. A method as claimed in claim 1, wherein a flow is flushed by writing an empty segment in order to commit the previous segment from that flow.

14. A data storage system as claimed in claim 13, wherein any segments which do not contain any current data blocks are excluded from a rebuilding process.

15. A data storage system having storage devices in which segments of data are located, including a plurality of flows provided in the data storage system from which data is written in segments to the storage devices, each segment of data also containing meta-data relating to that segment; wherein meta-data in the data storage system can be rebuilt using the meta-data in the segments excluding the meta-data for the segments identified as being the last segments written from each flow.

16. A data storage system as claimed in claim 15, wherein the data storage system includes a processor and memory, and the data storage devices are an array of storage devices having a plurality of data blocks organized on the storage devices in segments distributed across the storage devices, wherein when a data block in a segment stored on the storage devices in a first location is updated, the updated data block is assigned to a different segment, written to a new storage location and designated as a current data block, and the data block in the first location is designated as an old data block, and having a main directory, stored in memory, containing the locations on the storage devices of the current data blocks.

17. A data storage system as claimed in claim 16, wherein the data storage system is a log structured array and the storage devices are a plurality of direct access storage devices.

18. A data storage system as claimed in claim 16, wherein the last segment written from each flow is excluded from a free space collection process.

19. A data storage system as claimed in claim 15, wherein the meta-data in the segments includes a description of the data blocks stored in the segment and ordering information.

20. A data storage system as claimed in claim 19, wherein the ordering information includes an identifier of the flow from which the segment was written and a sequence number relating to the order the segments are written from one flow.

21. A data storage system as claimed in claim 19, wherein the description of the data blocks and the ordering information are written atomically in the segment.

22. A data storage system as claimed in claim 21, wherein the description of the data blocks and the ordering information are written in a single sector in each segment.

23. A data storage system as claimed in claim 21, wherein the description of the data blocks in the segment and the ordering information are written in more than one sector in a segment and wherein the writes of the sectors in a segment are atomicised by including the segment sequence number in each sector.

24. A data storage system as claimed in claim 23, wherein a segment with a plurality of sectors containing meta-data is ignored in the rebuilding process if the sectors have different segment sequence numbers.

25. A data storage system as claimed in claim 15, wherein writing a segment from a flow commits the previous segment written from that flow.

26. A data storage system as claimed in claim 15, wherein a flow is flushed by writing an empty segment in order to commit the previous segment from that flow.

27. A computer program product stored on a computer readable storage medium, comprising computer readable program code means for performing the steps of: scanning meta-data in each segment in storage devices to identify the last segment written from each of a plurality of flows of data; rebuilding meta-data in the storage devices using the meta-data in the segments excluding the meta-data for the segments identified as being the last segments written from each flow.

* * * * *